United States Patent [19]
Klupt

[11] Patent Number: 5,199,663
[45] Date of Patent: Apr. 6, 1993

[54] LIMITED USE VIDEO CASSETTE

[76] Inventor: Carle D. Klupt, 8218 Arrowhead Rd., Baltimore, Md. 21208

[21] Appl. No.: 782,774

[22] Filed: Oct. 22, 1991

Related U.S. Application Data

[63] Continuation of Ser. No. 440,217, Nov. 22, 1989, abandoned.

[51] Int. Cl.$^5$ ............................................. G11B 23/087
[52] U.S. Cl. ..................................................... 242/199
[58] Field of Search ................................. 242/197–200; 206/387, 393; 229/141, 161, 921

[56] References Cited

U.S. PATENT DOCUMENTS

| | | | |
|---|---|---|---|
| 3,381,810 | 5/1968 | Lesher et al. | 206/393 |
| 4,748,529 | 5/1988 | Shiba et al. | 242/199 X |
| 4,765,563 | 8/1988 | Satoyoshi et al. | 242/199 |
| 4,883,176 | 11/1989 | Hart et al. | 206/387 |

Primary Examiner—Daniel P. Stodola
Assistant Examiner—William G. Battista, Jr.
Attorney, Agent, or Firm—Morton J. Rosenberg; David I. Klein

[57] ABSTRACT

A cassette housing for a recording medium and the transport mechanism for the recording medium is composed of a thin one-piece blank of self-supporting foldable material such as paperboard with indentation lines for folding it into a structure with a pair of generally parallel, spaced apart, planar side panels and an end panel between the side panels and extending normal thereto, and having tabs foldable along others of the indentation lines to form three more end panels extending normal to the side panels to enclose the transport mechanism within the structure and maintain the side panels parallel to each other with relative rigidity. The blank has cutouts to form openings in one of the end panels for passage of the recording medium therethrough while mounted on its transport mechanism. The blank also has slits therein associated with others of the indentation lines for folding portions of the blank to form further tabs for retaining the transport mechanism against substantial lateral movement within the structure. In a preferred embodiment, the recording medium is a magnetic tape and the transport mechanism is a pair of reels on which the tape is mounted for winding and unwinding as the reels rotate in synchronism. The retaining tabs allow independent freedom of rotation of the reels, and the side panels have cutouts to expose the internal portions of the hubs of the reels to permit the reels to be driven for recording or playback.

38 Claims, 2 Drawing Sheets

LIMITED USE VIDEO CASSETTE

This application is a continuation of application Ser. No. 07/440,217, filed Nov. 22, 1989, now abandoned.

BACKGROUND OF THE INVENTION

The present invention relates generally to video cassettes, and more particularly to a limited use recording medium cartridge having a one-piece structure adapted to house the transport mechanism on which the recording medium is wound and unwound, for loading directly into a video cassette recorder (VCR).

Present-day video cassettes are generally composed of a rigid plastic case or housing in which a pair of reels or spools on which a magnetic recording tape is wound are mounted side by side for rotation in unison on spaced capstans or spindles constituting part of the drive mechanism of a VCR. A mechanical latching system is used in the cassette to hold the reels in position when not in use. The tape is transferred from one reel to the other to move laterally adjacent the head(s) of the VCR for recording or playback. Such cassettes or cartridges are relatively inexpensive to manufacture for most applications, where the tape is of sufficient length to record or have recorded thereon a presentation of at least about sixty minutes or more of viewing (or listening) time.

Where the tape is pre-recorded with only a short presentation, however, for the purpose of providing an advertising, sample, or preview presentation which may run only a few minutes in length, for demographic distribution, the cost of the plastic video cassette becomes prohibitive. Moreover, such short presentations are usually intended for only one or a few plays, not for repeated viewings. Hence, ideally, the cassette used for such purposes should be sufficiently inexpensive, both in terms of cost of materials and cost of manufacture, to render it virtually disposable in normal use. Also the materials used in the limited use cassette are lighter in weight than the conventional cassette and therefore, the cost of mailing the limited use cassette is lower than with the conventional cassette. This is in contrast, of course, with the conventional video cassette which, whether prerecorded or to be used for recording an event, is intended for repeated viewings (as well as possible erasures and re-recordings) over perhaps many years, and therefore is not intended to be disposable in normal use.

It is a principal object of the present invention to provide an inexpensive and easily fabricated limited use video cassette for recording and playback only a few times.

Another object of the present invention is to provide a video cassette which is sufficiently inexpensive to manufacture to render it disposable after limited use.

U.S. Pat. No. 4,453,683 to Reimer et al. discloses a magnetic tape cassette arrangement in which the recording tape reels are mounted in a holder constructed of two or more pieces which may be composed partly of cardboard and are joined together to hold the reels. As described in that patent, the holder is constructed and configured to be used in conjunction with a separate, rigid, precision-made plastic housing into which it is inserted for loading the entire cassette arrangement into the recording machine for recording and playback therein.

Such prior art cassette arrangements are costly to manufacture, notwithstanding being constructed partially from cardboard, because of a multi-piece construction of the holder and the requirement of a separate, plastic, precision-made housing to be available for use of the overall structure in a recording machine.

It is a further object of the present invention to provide a cassette housing for a recording medium which is of one-piece construction and self-contained for loading directly in a record player.

SUMMARY OF THE INVENTION

Briefly, according to the present invention, a low cost record cassette is provided for use in recording and playback in a recording machine. According to a principal aspect of the preferred embodiment of the invention, the housing for a video cassette is formed entirely from a single piece of self-supporting foldable material such as paperboard folded along preformed fold lines to enclose a pair of reels, on which the recording tape is wound, positioned side-by-side for rotation between a pair of side panels of the paperboard housing. The side panels are separated by end panels of the paperboard housing, by a distance just sufficient to accommodate the reels for rotation. One of the side panels has cutouts to expose the internal drive mechanism of the reels, so that the cassette may be mounted on the mating drive mechanism of the VCR.

According to an important feature of the invention, the housing further includes tabs formed by folding out slitted portions of the paperboard along preformed fold lines to separate the reels from one another, and also to prevent them from shifting laterally, while enabling them to rotate freely within the paperboard housing. At least one of these tabs, after being folded to its separating position, forms a viewing hole in the paperboard housing for exposing the amount of recording tape remaining on a reel. If desired, before or after the reels are loaded into the housing and before it is closed, the reels may be further secured to prevent shifting during transit and storage by application of a low-tack adhesive to the internal surface of one of the side panels against which the reels rest. The adhesive is of insufficient strength to avoid being ruptured upon use of the cassette in a VCR, or to prevent any drag on the reels during play of the cassette.

One of the end panels has cutouts for passage of the recording tape therethrough and against its external surface as the tape is wound and unwound on the reels. According to another feature of the invention, that external surface is coated with a material having a lower coefficient of friction than other portions of the surface of the paperboard housing, to reduce drag of the recording tape as it is transferred from one reel to the other, particularly during rewinding of the tape.

Constructed in this manner, the housing is sufficiently economical to render the entire video cassette disposable after a single playback of a video recording thereon. Also, the reduced weight of the material used to make the cassette also reduces mailing costs for the advertiser. Although the preferred self-supporting foldable material used to form the cassette housing is paperboard and the term paperboard will be used to describe the invention herein, it should be understood that other thin blanks of self-supporting foldable materials such as corrugated board, low density plastic such as polyethylene and other fiber products such as pressboard may be used.

A preferred method for making such a self-contained limited life cassette according to the invention includes forming a thin one-piece blank of self-supporting foldable material such as paperboard with fold lines, cutouts and slitted tab portions arranged and adapted to allow folding the paperboard into a complete housing for retaining the reels in juxtaposition for rotation therein. The paperboard is then partially folded to form two side panels and at least one end panel of the housing.

The reels are then inserted side by side between the side panels so that the internal drive mechanism of the reels is exposed at cutouts in one of the side panels, and the recording tape wound on one of the reels is threaded through cutouts in the end panel so that the strip of tape confronts and moves along the external surface of the end panel. The free end of the tape is then fastened to the other (empty) reel to be wound thereon during use of the cassette in a tape recording machine.

The housing is then completed by folding the paperboard at the remaining fold lines to securely retain the reels in place separated from one another while allowing them to rotate freely when loaded into and driven by the tape recording machine. The resulting end panels of the housing may be fastened together with an adhesive applied to their confronting surfaces or by use of lightweight adhesive tape. The end panels themselves and tabs associated with them are arranged and adapted to render the structure sufficiently rigid to prevent the corners from being crushed in normal handling, and the presence of the reels within the structure affords similar desirable rigidity to the sides of the cassette.

It is, therefore, another object of the present invention to provide a low cost record cassette having an entirely paperboard or other self-supporting foldable material housing of one-piece construction for rotatably mounting the transport mechanism of the recording medium.

A further object of the invention is to provide a method of manufacturing a disposable video cassette using a one-piece development paperboard as the housing for the cassette.

Yet another object of the invention is to provide a paperboard housing for a video cassette which is both self-contained for loading directly into a VCR, and sufficiently rigid to avoid damage to itself or its recording medium contents in normal handling.

Still another object of the invention is to provide a video cassette having a housing of one-piece construction and which is provided with fold down tabs that serve to separate and prevent lateral shifting of the reels in the housing.

SUMMARY OF THE DRAWINGS

The above and still further objects, features and attendant advantages of the present invention will become apparent from consideration of the following detailed description of the presently preferred embodiment of the invention, taken in conjunction with the accompanying drawings, in which.

DETAILED DESCRIPTION OF THE PREFERRED EMBODIMENT

Figure 1:
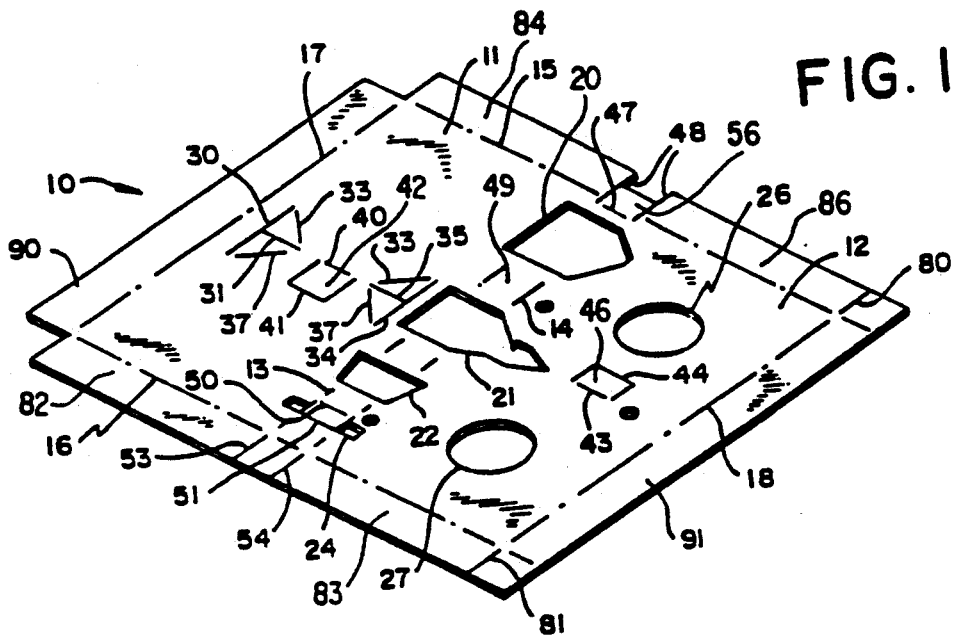
FIG. 1 is a top view of the one-piece development paperboard used to form the cassette housing according to the presently preferred embodiment of the invention.

Referring now to the drawings, and initially to FIG. 1, a presently preferred embodiment of a video cassette according to the invention includes a housing of one-piece construction. As will be seen from the ensuing Figures of drawing and accompanying text, the housing is arranged and adapted to be developed for rotatably mounting a pair of reels for a recording tape in juxtaposition therein, to allow transfer of the tape from one reel to the other in passage across the recording or playback heads as the reels undergo rotation in unison when the cassette is operating in a video cassette recorder (VCR, not shown).

In its initial state, the housing is a flat piece self-supporting rigid material preferably of development cardboard or paperboard 10 which may be stamped or punched from 16 point or 20 point paperboard stock, for example. The stock may be of any desired color or may be printed with an advertising message or pattern on the surface which will become the external surface of the housing, this being the top surface as viewed in FIG. 1. In the punching process, plural cutouts, fold lines and slits are provided in the paperboard 10 for purposes which will be discussed presently.

In particular, the punching defines two side panels 11 and 12 by means of indentation lines or fold lines 13, 14, 15, 16, 17 and 18. Fold lines 13 and 14 define a first end panel 49 between the two side panels 11 and 12. Fold lines 15 and 16 define opposite ends of the side panels and also opposite end panel portions of fourth and third end panels 94, 93 of the housing. Fold lines 17 and 18 define portions of the second and final end panel 95 of the housing. All folds, including those to be mentioned in the subsequent description herein, are made downwardly as viewed in FIG. 1.

The developmental paperboard 10 is also provided with a set of cutouts or punchouts some of which are configured to accommodate loading the ultimate cassette into a VCR, and others for use in conjunction with reels of recording tape to be mounted in the housing. The former include cutouts 20, 21 and 22. Cutout 24 is intended, together with associated slits and fold line to be described, to allow passage of the tape from the interior to the exterior of the housing. Cutouts 26 and 27 are provided to expose the interior of the hubs which form the drive mechanism of the reels for the recording tape.

Disposed along the central axis of substantial symmetry through the two side panels 11 and 12 are several slitted regions and associated fold lines, configured to form tabs for separating the two reels to be housed in the paperboard housing, and for preventing lateral shifting of the reels within the housing. Specifically, two triangular regions in side panel 11 include slits 30, 31 and 34, 35, and fold lines 33 and 37. Each of these triangular regions, when forced downward along the fold lines; forms a pair of triangular tabs 60, 61 and 64, 65 positioned to accommodate the circular shape of the reels and to hold them against lateral shifting in the housing.

Another pair of tabs 42 and 46, rectangular in shape and ultimately used for separating the two reels, is formed by fold lines 40 and 43 along the aforementioned axis, in side panels 11 and 12, respectively, and by slits for the other three sides of each as indicated at 41 and 44. When the folding is completed to develop the housing, these two rectangular tabs 42 and 46 will be disposed against one another and define the central axis separating the two enclosures for the reels within the housing.

It will be observed that the end panel formed by fold lines 13 and 14 has at one of its ends a fold line 47 which is offset inwardly of the periphery of the paperboard from the fold line 15, and slits 48 extending from fold line 47 to the periphery along foldlines 13 and 14. When the thus formed rectangular tab 56 is folded downward, and the housing is ultimately completed, a slot is formed at the offset portion to admit the recording tape at one end of this end panel. As previously mentioned, the cutout 24 near the other end of this end panel, together with an associated fold line 50 and slit 51, provide a corresponding function (to admit the tape) at the other end. For that purpose, the tab formed by the slit, fold line and cutout is folded downward to open a slot for the tape. Thus, the tape may be threaded from the interior to the exterior of the housing and back to the interior, through the slots formed at either end of this end panel. Moreover, the fold line of each of the tabs at these slots provides a smooth surface on which the tape rides as it is transferred from one reel to the other during recording or playback of the cassette.

Slits 53 and 54 extending from fold line 16 along fold lines 13 and 14 to the periphery of the paperboard 10 define a tab which, when the development is completed, serves to enhance the rigidity at a corner of the housing. A similar function is provided for two other corners of the housing by the tabs formed by slits 80 and 81 extending from fold lines 15 and 16, respectively, along fold line 18 to the periphery of the paperboard 10. At the opposite end of the paperboard, the regions corresponding to these tabs, at the intersection of foldlines 15 and 17 and of 16 and 17, are simply removed because when all of the folds or bends are made to complete the housing the latter two tabs are positioned at those intersections (which are then corners of the housing).

Figure 3:
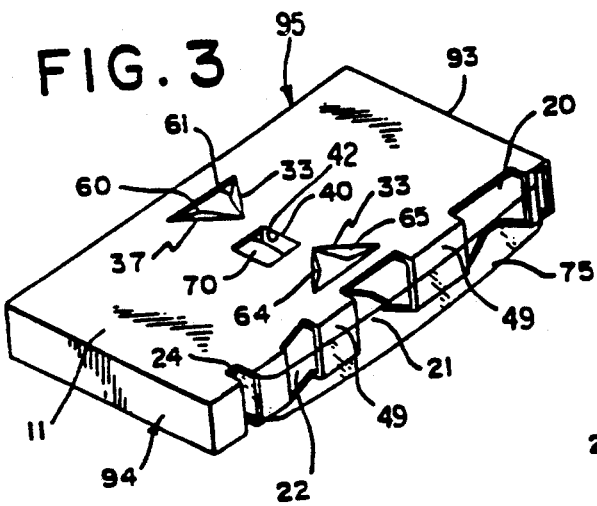
FIGS. 3 and 4 are perspective views of the preferred embodiment of the cassette looking toward the top and bottom of the structure, respectively.
Figure 4:
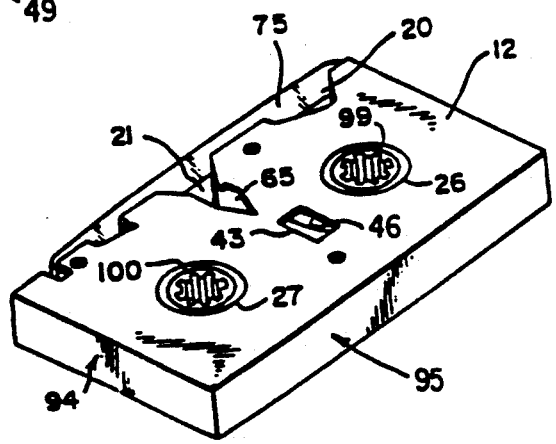
Figure 2A:
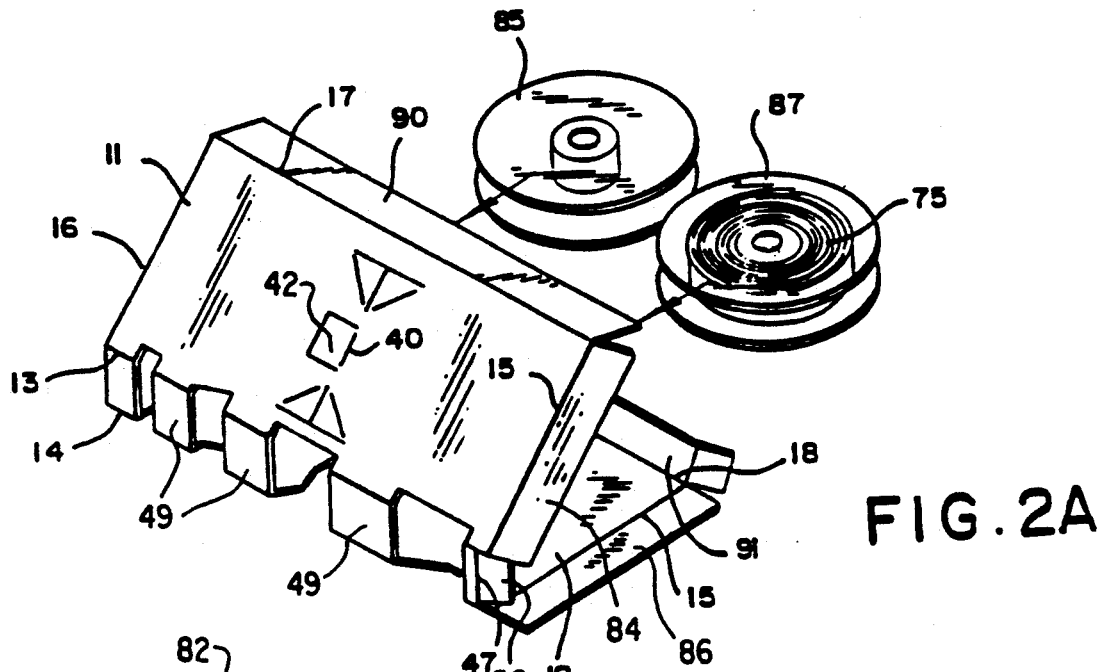
FIGS. 2A, 2B and 2C are perspective views (FIGS. 2B and 2C being partially fragmented) of the cassette in various stages of the development, according to the preferred embodiment and manufacturing method.
Figure 2B:
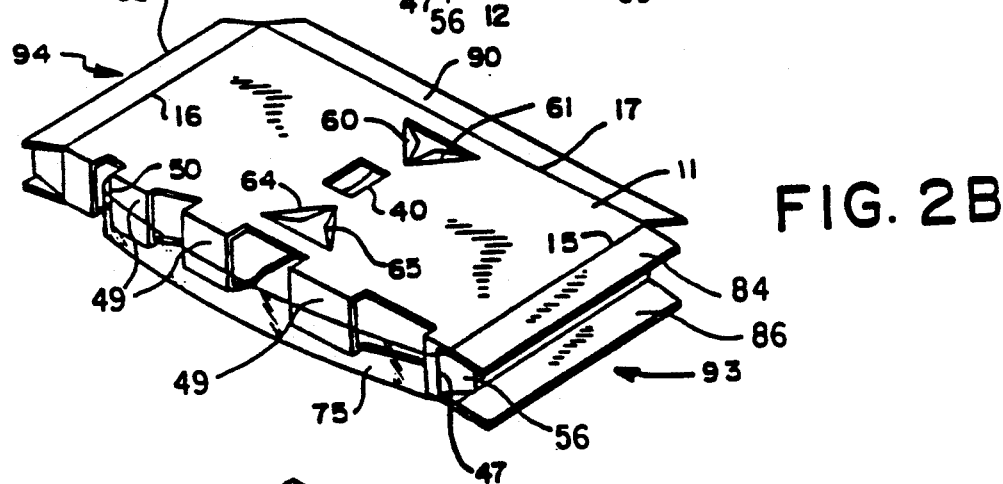
Figure 2C:
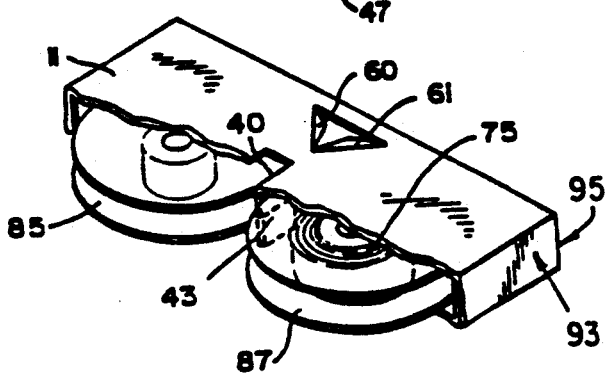

The process for forming the housing for the video cassette will be more clearly understood by further reference to the developmental stages depicted in FIGS. 2A, 2B and 2C, as well as the completed housing shown in top and bottom views in FIGS. 3 and 4, respectively. Initially, paperboard 10 is bent or folded along parallel fold lines 13 and 14 to begin the general definition of the housing with side panels 11 and 12 and the connecting end panel containing the cutouts and tape slots. Folds are also made along fold lines 15, 16, 17, 18, 47 and 50 to generally shape the strips 82, 83, 84, 86, 90, 91 which will form the other end panels and to form the rigidizing tabs at three of the corners, and the two tape slots at opposite ends of the connecting end panel. The pair of separator tabs 42 and 46 generally disposed in the center of the side panels are then folded inwardly of the housing at fold lines 40 and 43.

A pair of reels 85 and 87, one having a recording tape 75 wound thereon, are then inserted into the space between the side panels 11 and 12 so that the reels are juxtaposed with the separator tabs 42 and 46 therebetween. The free end of the recording tape is then threaded through the slots in the connecting end panel so that the tape 75 rides against the folds 47 and 50 and associated tabs, and the external surface of the connecting end panel. To prevent drag along those surfaces as the tape is transferred from one reel to the other in rewind of the cassette, the entire external surface of the connecting end panel is coated with a low friction varnish or Teflon (DuPont Company trademark) tape, preferably before actual development of the housing is commenced. This procedure provides that surface with a lower coefficient of friction tha the other exposed surfaces of the housing.

After passage of the free end of the tape through the two slots in the connecting end panel, it is fastened to the hub of the empty reel 85. It will be apparent then, that upon rotation of the empty reel during play of the cassette, the tape will be wound thereon as it unwinds from the other reel 87.

Next, the free ends of the side panels are fully bent along fold lines 17 and 18 parallel to the two fold lines 13 and 14, to form strips 90 and 91 which will abut one another to form a second end panel 95 opposite the connecting end panel. The two strips may be bonded together by use of a self sealing adhesive which is applied to the abutting surfaces thereof after the development paperboard is stamped out, or by gluing at the time they are to be joined, or by use of an adhesive tape after they are brought together. By closing this second end panel 95, reels 85 and 87 are now partially secured in their respective enclosures within the housing.

The pair of tabs at either end of strip 91 are then folded inwardly along fold lines 15 and 16 and inserted normal to the second end panel. Then the third and fourth end panels 93 and 94 of the housing are formed by bending opposite ends of each of the side panels 11 and 12 inwardly along fold lines 15 and 16 on each side panel, after each of the rigidizing tabs has been tucked in at the corners of the structure. The respective pairs of abutting strips 82, 83, and 84, 86 that form those end panels may now be fastened together in the same manner as was described above for the second end panel. This completes the six-sided housing enclosing the pair of reels 85 and 87, to form the video cassette.

The triangular tabs 60, 61 and 64, 65 provided in side panel 11 are then bent inwardly of the housing along fold lines 33 and 34, to retain the reels in place against lateral shifting while allowing them freedom to rotate within the housing. The rectangular tabs 42 and 46 formed along fold lines 40 and 43 abut against one another in the housing and serve as retaining tabs to separate the reels to prevent them from binding against each other during rotation. One of these retaining tabs 42 forms a hole 70 (FIG. 3) in the housing along a transparent flange of a reel, to permit viewing the extent of tape remaining on that reel.

Figure 5:
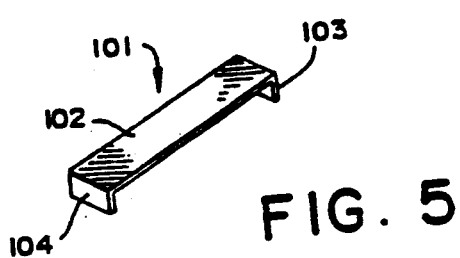
FIG. 5 is a perspective view of a reel lock used to secure the cassette reels for shipping.

The circular cutouts 26 and 27 in side panel 12 forming the base of the housing are slightly larger than the internal slotted surface of the hole in the hubs 99 and 100 of reels 87 and 85 (FIG. 4). Hence, when the reels are mounted within the housing, the drive mechanism of the reels constituted by the slotted holes is exposed for mounting on the mating drive mechanism of the VCR when the video cassette is loaded into a VCR. The reels may be further secured in the housing by application of a low-tack adhesive to the internal surface of a side panel against which they rest, to prevent movement thereof during storage, handling and insertion. Such adhesive should be of sufficiently low adherence so that the reels are easily lifted by the VCR mechanism. Although not shown, the adhesive can alternately be placed on one or both reels. During mailing or shipping of the cassette a reel lock 101 as seen in FIG. 5 is used to maintain the reels 85 and 87 in a fixed position. The reel lock 101 comprises a longitudinal planar section 102 having a length equal to the spacing of the reels 85 and 87 and a pair of downwardly depending tabs 103, 104 adapted to fit within opposing slots in hubs 99 and 100 respectively.

The preferred use of a video cassette according to the present invention is for advertising or preview showings for distribution to demographically determined groups of prospective viewers. Of course, this is not intended as a limitation, but for such purposes the cassette would be prerecorded for playback only. For other purposes, it would be desirable to allow recording as well as playback of the cassette.

From the foregoing description, it will be seen that the present invention provides a video cassette, and in particular a housing for a video cassette, which is sufficiently economical in both materials and fabrication process to render the entire video cassette disposable after a single playback of a video recording thereon.

Although a presently preferred embodiment and process of the invention have been disclosed herein, it will be apparent to those skilled in the art to which the present invention pertains that variations and modifications of the described illustrative embodiment and process may be made without departing from the true spirit and scope of the invention. For example, the principles of the invention may be applied to record cassettes other than video cassettes. It is therefore intended that the invention shall be limited only by the appended claims and the rules and principles of applicable law.

What is claimed is:

1. A video cassette for rotatably mounting a pair of reels for a recording tape in juxtaposition to allow transfer of the tape from one reel to the other as they are rotated in unison when the cassette is operating in a video cassette recorded (VCR), comprising
   a single flat piece of development cardboard having plural cutouts and fold lines for formation into a self-contained housing for said reels accommodating said rotatable mounting thereof, for loading directly into the VCR, said single flat piece of said cardboard defining a pair of spaced apart side panels joined to an end panel by a first set of said fold lines, said end panel having a first set of said cutouts for passage of said tape adjacent thereto,
   said cutouts being arranged and adapted to accommodate positioning of said housing in said VCR, and a second set of said cutouts defining a pair of said cutouts being positioned in spaced apart relationship to expose the respective rotational driving mechanisms of said pair of reels when rotatably mounted in juxtaposition in said housing, for mating with the driving mechanism of the VCR when the cassette is loaded therein.

2. The invention according to claim 1, wherein
   said cardboard has plural slits associated with certain of said fold lines to form retaining tabs thereon for separating said reels and holding them to substantially prevent lateral movement while allowing rotational movement thereof.

3. The invention according to claim 2, wherein
   at least one of said retaining tabs, when positioned by folding, forms a viewing hole to expose the recording tape wound on one of said reels.

4. The invention according to claim 1, wherein
   said cardboard when formed into said housing has an end panel with at least two of said cutouts to permit said recording tape to move therethrough in proximity to the record/playback head of the VCR when the cassette is operating therein.

5. The invention according to claim 4, wherein
   said end panel has a surface with a lower coefficient of friction than the remaining surfaces of said housing to reduce resistance to the movement of said recording tape there across as said cassett is being operated in the VCR.

6. A cassette housing for a recording medium and the transport mechanism for the recording medium, comprising a one-piece flat paperboard having indentation lines for folding said paperboard into a structure with a pair of generally parallel, spaced apart, planar side panels and an end panel between said side panels and extending normal thereto, and having tabs foldable along others of said indentation lines to form three more end panels extending normal to said side panels to enclose said transport mechanism within said structure and maintain said side panels parallel to each other, said paperboard further having a pair of cutouts to form openings in one of said panels formed through opposing ends thereof for passage of said recording medium therethrough while mounted on said transport mechanism.

7. The invention according to claim 6, wherein said paperboard further has slits therein associated with others of said indentation lines for folding portions of said paperboard to form further tabs for retaining said transport mechanism against substantial lateral movement within said structure.

8. The invention according to claim 7, wherein said recording medium is a magnetic tape and said transport mechanism is a pair of reels adapted to have said tape mounted for winding and unwinding thereon as said reels rotate in synchronism, and wherein said side panels are spaced apart by said end panels a distance just sufficient to sandwich said pair of reels in side by side relationship therebetween with rotational freedom, said retaining tabs being arranged and adapted to allow independent rotation of said reels, said side panels having cutouts arranged and adapted to cooperate with said reels to accommodate rotational driving thereof.

9. The invention according to claim 8, wherein said end panel having openings for passage of said recording medium therethrough has a low friction coating on at least portions of its surface contacted by said tape as it is wound and rewound on said reels.

10. The invention according to claim 9, wherein at least one of said retaining tabs forms a hole in said structure to permit viewing the extent of said tape wound on one of said reels.

11. The invention according to claim 9, wherein said end panel having openings therein is the first mentioned end panel.

12. The invention according to claim 11, wherein the tabs forming said three more end panels are adhesively secured together to from each of said three more end panels.

13. In a video cassette for use in recording and playback in video cassette recorder (VCR), the improvement wherein the housing for the video cassette is formed from a single piece of self-supporting foldable material folded along preformed fold lines to enclose a pair of reels, within an enclosure defined by said housing on which the recording tape is wound, side-by-side for rotation between a pair of side panels of the material separated by a distance just sufficient to accommodate the reels by end panels of the material attached to the side panels, said material including foldable tabs formed by folding out slitted portions of the material along preformed fold lines and bent internal to said enclosure and adjacent said reels to separate the reels from one another while enabling them to rotate freely within the material housing, one of said side panels having cutouts for mounting the cassette on the drive mechanism of the VCR, one of said end panels having cutouts for passage of the recording tape therethrough against the surface of that end panel as the tape is wound and unwound on the reels.

14. The improvement according to claim 13, wherein said surface of said end panel against which said recording tape passes is coated with a material having a lower coefficient of friction than other portions of the surface of said material.

15. The improvement according to claim 13, wherein said tabs are arranged and adapted to prevent said reels from shifting in said housing while remaining freely rotatable therein.

16. The improvement according to claim 15, wherein at least one of said tabs after folding to its separating position forms a viewing hole in the material housing for exposing the amount of recording tape remaining on a reel.

17. The improvement according to claim 13, wherein the reels are further secured in said material housing by a low-tack adhesive to prevent movement thereof prior to the use of the cassette in a VCR.

18. The improvement according to claim 13, wherein the reels are restrained from movement by a reel lock having interconnected tabs which fit into the reels.

19. The improvement according to claim 13, wherein said material is paperboard, and said fold lines are indented lines in said paperboard.

20. A process for producing a video cassette, comprising the steps of
stamping out a paperboard development card of one-piece construction, with predetermined fold lines cutouts and slitted portions,
bending the card along two parallel fold lines to form side panels in generally parallel planes spaced apart by an end panel formed between said parallel lines,
folding in a pair of separator tabs generally disposed in the center of the side panels, for contacting a pair of reels at a peripheral edge thereof;
inserting a pair of reels, one having a recorded tape wound thereon, into the space between said parallel side panels so that the reels are juxtaposed with the separator tabs therebetween, said reels comprising an internal drive mechanism for playback of said recorded tape,
threading a free end of the recorded tape through openings in said end panel so that the tape rides against the external surface of the end panel and fastening the free end of the tape to the hub of the empty reel so that upon rotation of said empty reel the tape will be wound thereon as it unwinds from the other reel,
bending free ends of said side panels along fold lines parallel to said first two fold lines to form a second end panel opposite the first end panel,
bending a pair of tabs at either side of one of said free ends of said side panels along fold lines therefor and inserting said tabs normal to said second end panel,
bending opposite ends of said side panels inwardly normal thereto along fold lines perpendicular to the first mentioned fold lines to form third and fourth end panels normal to said side panels and said first and second end panels, whereby to form a six-sided housing enclosing said pair of reels, and
bending triangular tabs slitted in one of said side panels inwardly of said housing along fold lines at an angle to the first mentioned fold lines to retain the reels in place while allowing them freedom to rotate wihtin said housing, and
adhesively securing together the pairs of ends which form said second, third and fourth end panels, respectively.

21. The process according to claim 20, further including the steps of
applying a material to the external surface of the first mentioned end panel having a lower coefficient of friction than the remaining surfaces of said housing to avoid drag on the recorded tape as it passes thereagainst.

22. The process according to claim 20, further including the step of forming a pair of cutouts in one of said panels to expose the internal drive mechanism of each of said reels for loading the video cassette into a video cassette recorder for playback thereof.

23. A method for making a self-contained disposable cassette for recording tape adapted to be wound and unwound on a pair of reels, comprising
forming a thin one-piece blank of self-supporting foldable material with fold lines, cutouts and slitted tab portions arranged and adapted to allow folding said blank into a complete housing for retaining said reels in juxtaposition for rotation therein,
partially folding said blank to form two side panels and at least one end panel of said housing,
inserting the reels side by side between the side panels so that the internal drive mechanism of the reels is exposed at cutouts in one of the side panels, and threading the recording tape wound on one of the reels through cutouts in the end panel so that the tape confronts and moves along the external surface of the end panel, and fastening the free end of the tape to the other reel for winding thereon during use of the cassette in a tape recording machine, and
bending a pair of separator tabs internal said housing and adjacent said reels to securely retain said reels in place separtaed from one another while allowing them to rotate freely when loaded into and driven by the tape recording machine.

24. A video cassette comprising a single substantially flat blank of self-supporting foldable material defining a housing for insert of a pair of reels, said blank including integral means consisting of foldable tabs for retaining said pair of reels for rotation in a plane and against substantial movement in any other direction, said blank being arranged and adapted to be folded into a self-contained housing for said reels accommodating said rotation thereof, for leading directly into a video cassette recorder (VCR), said integral means forming a part of said blank and insertable within said housing for positioning adjacent a periphery of each of said reels for preventing lateral movement thereof.

25. The invention of claim 24 wherein said reels include a recording tape wound thereon, and said retaining means retains said reels in juxtaposition in said plane when said blank is folded into said housing, whereby to allow transfer of the tape from one reel to the other as they are rotated in unison when the cassette is operating in the VCR.

26. The invention of claim 25 wherein said blank further includes a pair of cutouts positioned in spaced apart relationship to expose the respective rotational driving mechanisms of said pair of reels when rotatably mounted in juxtaposition in said housing, for mating with the driving mechanism of the VCR when the cassette is loaded therein.

27. The invention of claim 24 wherein said retaining means includes means for separating said reels in said plane to prevent interference therebetween during rotation.

28. The invention of claim 24 wherien said blank is composed of paperboard.

29. A cassette for a magnetic recording tape wound on a pair of reels, comprising flat, one-piece blank means composed of self-supporting bendable material for forming an enclosure for said reels, said blank means including mounting means for retaining said reels for rotation in spaced-apart relationship in a common plane while substantially restraining them against other movement within said enclosure, said mounting means including a plurality of tab members foldably insertable within said enclosure for contiguous interface with peripheral edges of said reels.

30. The invention of claim 29 wherein said blank means further includes a pair of holes positioned in spaced apart relationship to expose the respective rotational driving mechanisms of said pair of reels when retained by said mounting means in said enclosure, whereby to permit mating thereof with the driving mechanism of a cassette player when the cassette is loaded therein.

31. The invention of claim 30 wherein said blank is composed of paperboard.

32. A cassette for a recording medium and the transport mechanism for the recording medium, comprising a one-piece blank of self-supporting sheet material adapted to be formed into a six-sided housing for said recording medium and said transport mechanism therefor, said blank including means for mounting said transport mechanism in said housing while permitting movement of said recording medium for reproduction of intformation recorded thereon when the cassette is played in a reproducing machine, said mounting means including tab members integral with and insertable into said housing for placement adjacent peripheral edges of said transport mechanism.

33. The invention of claim 32 wherein said blank is composed of paperboard.

34. The invention of claim 32 wherein at least one side of said housing has an opening therein to expose said recording medium.

35. The invention of claim 34 including access means in a side of said housing to permit said transport mechanism to mate with the drive mechanism of the reproducing machine when the cassette is loaded therein.

36. The invention of claim 32 wherein said blank further includes means for preventing said housing from collapsing in normal use after formation thereof.

37. The invention of claim 36 wherein said preventing means includes means for adding rigidity at the corners of said housing.

38. The invention of claim 36 further including means on said blank for securing the sides of said housing together.

* * * * *